(12) United States Patent
Forster (10) Patent No.: US 12,020,100 B2
(45) Date of Patent: Jun. 25, 2024

(54) SYSTEMS AND METHODS OF TRANSLATING WIRELESS DEVICE SIGNALS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 192 days.

(21) Appl. No.: 17/776,727

(22) PCT Filed: Nov. 16, 2020

(86) PCT No.: PCT/US2020/060735
§ 371 (c)(1),
(2) Date: May 13, 2022

(87) PCT Pub. No.: WO2021/097428
PCT Pub. Date: May 20, 2021

(65) Prior Publication Data
US 2022/0391654 A1    Dec. 8, 2022

Related U.S. Application Data

(60) Provisional application No. 62/936,447, filed on Nov. 16, 2019.

(51) Int. Cl.
*G06K 19/07* (2006.01)
*G06K 7/10* (2006.01)
(Continued)

(52) U.S. Cl.
CPC ..... *G06K 19/0724* (2013.01); *G06K 7/10237* (2013.01); *G06K 7/10297* (2013.01);
(Continued)

(58) Field of Classification Search
CPC .......... G06K 19/0724; G06K 7/10237; G06K 7/10297; G06K 19/07767; G06K 17/0025; H04L 69/08; H04W 4/80; B41J 3/50
(Continued)

(56) References Cited

U.S. PATENT DOCUMENTS 7,798,403 B2    9/2010  Tiller et al.
8,448,041 B1 *  5/2013  Zeng ................. H03M 13/116
                                                        714/758
(Continued)

FOREIGN PATENT DOCUMENTS

CN    202351907 U    7/2012
CN    208188835 U    12/2018
(Continued)

OTHER PUBLICATIONS

International Preliminary Report on Patentability dated May 17, 2022 issued in corresponding IA No. PCT/US2020/060735 filed Nov. 16, 2020.
(Continued)

*Primary Examiner* — Omar Casillashernandez (57) ABSTRACT

In some embodiments, a wireless electronic device translation system includes a translator that includes a first antenna, a second antenna, and a controlling unit coupled to the first antenna and the second antenna. The translator may be configured to receive a wireless communication signal transmitted from a first electronic device at a first frequency, interpret a communication content from the wireless communication signal using a first communication protocol, translate the first communication content to be transmitted as a wireless translated signal using a second communication
(Continued)

protocol, and transmit the wireless translated signal at a second frequency to be received by a second electronic device.

18 Claims, 7 Drawing Sheets

(51) Int. Cl.
*G06K 19/077* (2006.01)
*H04L 69/08* (2022.01)
*H04W 4/80* (2018.01)

(52) U.S. Cl.
CPC ........ *G06K 19/07767* (2013.01); *H04L 69/08* (2013.01); *H04W 4/80* (2018.02)

(58) Field of Classification Search
USPC ........................................................ 340/10.1
See application file for complete search history.

(56) References Cited

U.S. PATENT DOCUMENTS

| | | | |
|---|---|---|---|
| 10,599,887 | B2 | 3/2020 | Duckett et al. |
| 2009/0215394 | A1 | 8/2009 | Dewan |
| 2010/0066511 | A1 | 3/2010 | Barnett et al. |
| 2011/0068987 | A1 | 3/2011 | Carr |
| 2014/0229246 | A1* | 8/2014 | Ghaffari ............. G06K 7/10237 705/13 |
| 2019/0274144 | A1* | 9/2019 | Zhang ............... H04W 52/0203 |
| 2020/0210654 | A1 | 7/2020 | Duckett et al. |
| 2021/0067924 | A1* | 3/2021 | Begley ................. H04L 67/146 |

FOREIGN PATENT DOCUMENTS

| | | |
|---|---|---|
| CN | 111370845 | 7/2020 |
| EP | 3115937 | 1/2017 |
| EP | 2344977 | 9/2017 |
| JP | 2003-159838 | 6/2003 |
| JP | 2005-103891 | 4/2005 |
| JP | 2007-241940 | 9/2007 |
| JP | 2011-76266 | 4/2011 |
| JP | 2011-239180 | 11/2011 |
| JP | 2016-197405 | 11/2016 |
| JP | 2018-14662 | 1/2018 |

OTHER PUBLICATIONS

International Search Report and Written Opinion dated Feb. 11, 2021 issued in corresponding IA No. PCT/US2020/060735 filed Nov. 16, 2020.
Dang et al., "In-body/Out-body Dual-Use 920MHz/5.02GHZ Dual-Band RFID System," Research Institute for Electrical Communication, Tohoku University., Mar. 17, 2020, p. 96.

* cited by examiner

SYSTEMS AND METHODS OF TRANSLATING WIRELESS DEVICE SIGNALS

CROSS-REFERENCE TO RELATED APPLICATION

The present application is a 371 of International Application No. PCT/US2020/060735, which was published in English on May 20, 2021, and claims the benefit of U.S. Provisional Patent Application No. 62/936,447 filed Nov. 16, 2019, both of which are incorporated herein by reference in their entireties.

BACKGROUND

The present subject matter relates to wireless device signals. More particularly, the present subject matter relates to using translation to facilitate wireless communication between at least two different devices.

Various wireless devices, such as RFID devices, may comprise an integrated circuit or chip and an antenna and may be used to associate an object with an identification code. A wireless device may only operate using a particular frequency and/or a particular communication protocol. Some access devices, such as an RFID reader, may be unable to communicate with the wireless device because it lacks the capability to communicate wirelessly using the particular frequency and/or the particular communication protocol. Although some access devices may have the ability to communicate using multiple frequencies and/or communication protocols, such access devices may lack capabilities of devices that a consumer has already purchased, and may come at a high cost. Accordingly, improvements may be made over existing systems.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In some embodiments, a wireless electronic device translation system includes a translator. The translator includes a first antenna, a second antenna, and a controlling unit coupled to the first antenna and the second antenna. The translator is configured to receive a wireless communication signal transmitted from a first electronic device at a first frequency, interpret a communication content from the wireless communication signal using a first communication protocol, translate the first communication content to be transmitted as a wireless translated signal using a second communication protocol, and transmit the wireless translated signal at a second frequency to be received by a second electronic device.

In various embodiments, the first frequency may be different from the second frequency. The system may further include an access device configured to use the first communication protocol to transmit the wireless communication signal having a first frequency. The frequency of the wireless communication signal may be within an ultra high frequency band, and the frequency of the wireless translated signal is within a high frequency band. The controlling unit may include at least one of an RFID chip and a microcontroller. The first antenna may be configured to receive signals in the same frequency band as the wireless communication signal, the second antenna may be configured to transmit the wireless translated signal.

In various embodiments, the system further includes a power supply configured to place the translator into an operative state when an access device is in an operative state. Some systems include a power supply configured to place the translator into an operative state when the translator receives the wireless communication signal. The power supply may include a battery.

In various embodiments, the wireless communication signal may be configured to encode a first part of a dual-frequency RFID label and the wireless translated signal is configured to encode a second part of a dual-frequency RFID label. The access device may be an RFID printer comprising a print head, and the print head may be configured to render an RFID label unreadable when there has been an error in encoding the RFID label.

In various embodiments, a method includes, using a translator, receiving a wireless communication signal transmitted from a first electronic device at a first frequency, interpreting a communication content from the wireless communication signal using a first communication protocol, translating the first communication content to be transmitted as a wireless translated signal using a second communication protocol, and transmitting the wireless translated signal at a second frequency to be received by a second electronic device.

The first frequency may be different from the second frequency. The method may further include, using an access device, transmitting the wireless communication signal having a first frequency in accordance with the first communication protocol. The frequency of the wireless communication signal may be within an ultra high frequency band, and the frequency of the wireless translated signal may be within a high frequency band.

The translator may include a controlling unit that includes at least one of an RFID chip and a microcontroller, a first antenna electrically coupled to the controlling unit, the first antenna being configured to receive signals in a frequency band compatible with the communication signal, and a second antenna electrically coupled to the controlling unit and configured to transmit said translated signal.

The method may include placing the translator into an operative state when an access device is in an operative state. The method may include placing the translator into an operative state when the translator receives the communication signal. The translator may include a power supply that includes a battery. The method may include, using the communication signal, encoding a first part of a dual-frequency RFID label, and using the translated signal, encoding a second part of a dual-frequency RFID label. The access device may be an RFID printer that includes a print head, and the method may include, using the print head, rendering an RFID label unreadable when there has been an error in encoding the RFID label.

DESCRIPTION OF THE ILLUSTRATED EMBODIMENTS

The embodiments disclosed herein are exemplary only, and the subject matter described herein may be embodied in various forms. Therefore, specific details disclosed herein are not to be interpreted as limiting the subject matter as defined in the accompanying claims.

In various embodiments, a user of a device such as an RFID printer, RFID reader, smart phone, or other device may wish to interact with one or more target electronic devices via wireless communication. By using one or more of the translators and/or other systems and methods disclosed here, the user may be enabled to perform various actions with the target electronic device that would not otherwise be possible, such as to communicate with, read from, write to, program, and/or control the target electronic device as discussed in greater detail below with respect to various embodiments.

Access Device

Figure 1:
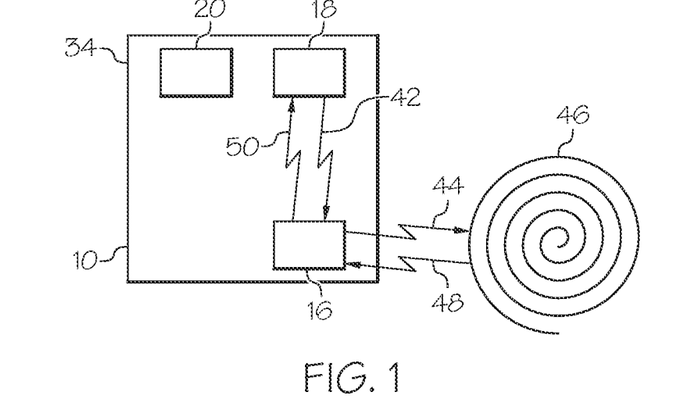
FIG. 1 is a block diagram of an exemplary access device according to some embodiments of the present disclosure.

FIG. 1 includes an access device 10 according to some embodiments of the present disclosure. In various embodiments, access device 10 may comprise, consist of, or compose at least a part of an RFID printer, an RFID reader, a mobile device, a computer, a laptop, a smartphone, a smart watch, computer system 400, or other devices. (See FIG. 8 and associated description). The access device 14 of FIG. 2 may be the same as the access device 10, except it may not include a translator 16.

Access device 10 may be configured to communicate with one or more target wireless devices 46 such as RFID tags, RFID labels, RFID inlays, NFC tags, NFC devices, Bluetooth devices, infrared tags, WIFI transponders, terminals, card readers, or other tags, chips, or devices. Access device 10 may communicate with such target wireless devices for various purposes such as reading data associated with the target wireless device, writing data to the target wireless device, identifying the target wireless device, and/or tracking the location of the target wireless device.

Access device 10 may lack the proper antenna, software, firmware, or other hardware needed to communicate with a particular target wireless device 46 based on particular parameters that apply. Parameters may include frequency of communication, communication protocols, or other software or hardware requirements or limitations. For example, access device 10 may have components (e.g., antennas, firmware, processors, integrated circuits, circuits) configured for communicating only within a first range of frequencies, and the target wireless device 46 may communicate only in a second range of frequencies that does not overlap with the first range of frequencies. Alternatively, access device 10 and target wireless device 46 may have one or more frequency ranges that they both can transmit and/or receive, but they may have other incompatible parameters, such as incompatible communication protocols, programming, hardware, or other issues.

Figure 5:
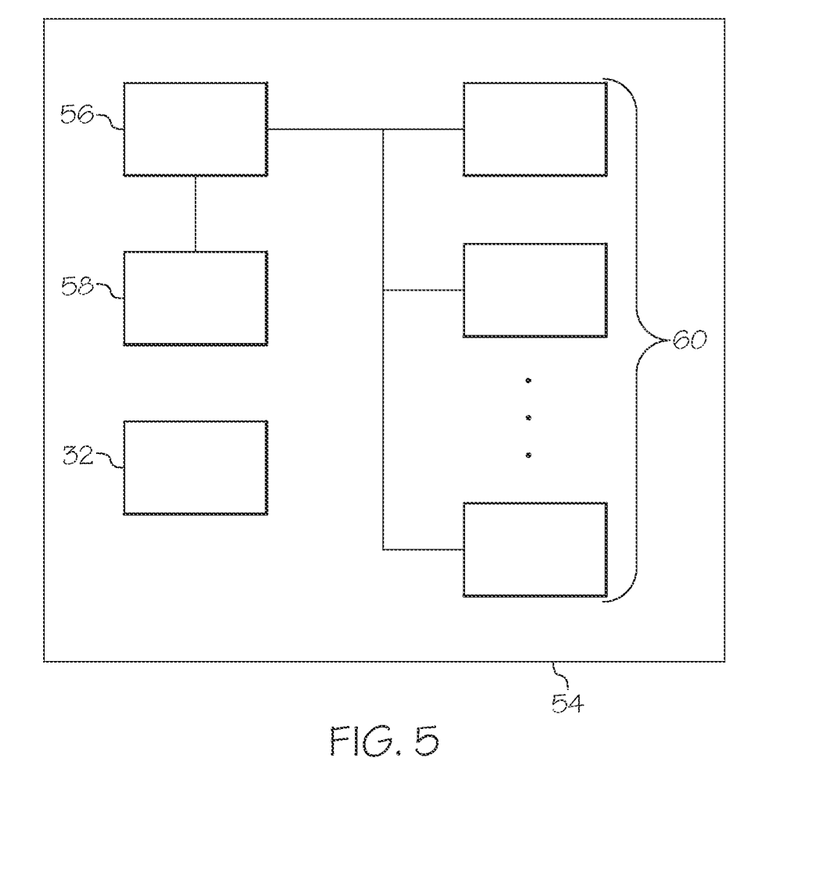
FIG. 5 is a block diagram of an exemplary communication unit according to some embodiments of the present disclosure.

In various embodiments, the access device 10 may include a communication unit 18. The access device 10 may further include a translator 16 (e.g., translator 52, translator 204), and in some embodiments, the access device 10 may include a print head 20. The communication unit 18 may be the same as the communication unit 54 of FIG. 5. As shown in FIG. 5, a communication unit 54 (e.g., communication unit 18) may include one or more of: a processor 56, a memory 58, an antenna 60, and a power supply 32. In various embodiments, the communication unit 54 may include 1, 2, 3, or more antennas 60 which may each be configured to operate at different frequency range and/or with different communication protocols. In other embodiments, multiple antennas 60 may operate in overlapping frequency ranges for various purposes, such as for tracking or enhanced communication.

Print Head

In various embodiments, the print head 20, if included, may be capable of applying print (e.g., ink in a bar code pattern) to an RFID label. In some embodiments, the RFID printer 10, 14 is configured to control the print head 20 to alter an RFID label to render the RFID label unreadable when there has been an error in encoding the RFID label. This may include applying print to an RFID label in a pattern that prevents the RFID label from being used.

Figure 2:
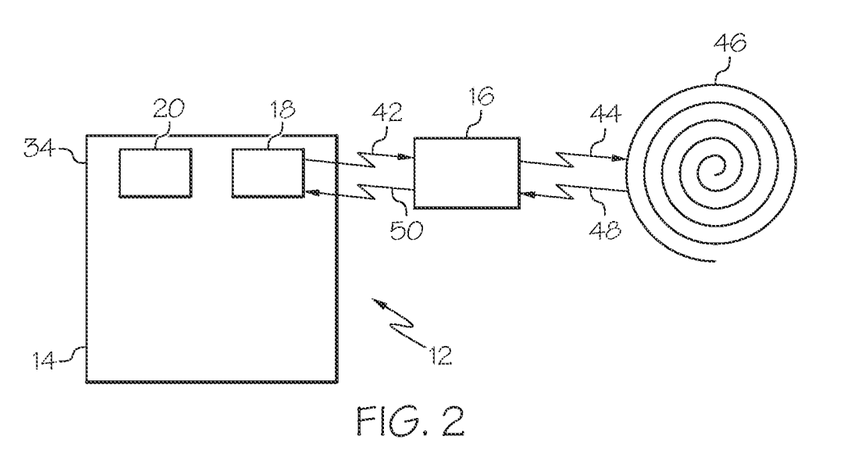
FIG. 2 is a block diagram of an exemplary system for programming an RFID label or device according to some embodiments of the present disclosure.

After an RFID label has been encoded or programmed, the access device 10, 14 may check to ensure that there has been no error, such as by attempting to communicate with the RFID label via the translator 16. If there has been an error in encoding or programming the RFID label, the print head 20 may be employed to render the RFID label unreadable. For some embodiments in which the access device 10 of FIG. 1 and the system 12 of FIG. 2 is or includes an RFID printer, the access device 10 may be configured such that a target wireless device 46 such as an RFID label has been fully encoded (using only the communication signal 42, only the translated signal 44, or both of the signals 42 and 44, as appropriate) before being processed by the print head 20.

Communication Unit

In various embodiments, the communication unit 18 (e.g., communication unit 54) may include one or more of a processor 36, a memory 38, and/or one or more antennas 40, as shown in FIG. 5. The communication unit 18 and one or more of its components may be configured to transmit a programming or other communication signal 42 having a first frequency within a particular frequency band and/or using a first communication protocol. The communication unit 18 and one or more of its components may be further configured to receive a translated wireless device signal 50 having the first frequency within the particular frequency band and/or using the first communication protocol. As discussed in greater detail below, the translator 16 may be configured to receive the communication signal 42 and/or to transmit the wireless device signal 48 using the first frequency and/or the first communication protocol. The translator 16 may also be configured to transmit the translated signal 44 or receive the wireless device signal 48 using the second frequency and/or the second communication protocol.

In various embodiments, the first frequency and the second frequency may each fall within one or more frequency bands such as LF, HF, UHF, microwave, or other frequencies. Some exemplary frequencies are discussed in the table below:

TABLE 1

Communication Frequencies

| Frequency Band | Regulations | Range |
| --- | --- | --- |
| LF: 120-150 kHz | Unregulated | 10 cm |
| HF: 3-30 MHz (e.g., 13.56 MHz) | ISM band worldwide | 10 cm-1 m |
| UHF: 433 MHz | Short range devices | 1-100 m |
| UHF: 865-868 MHz (Europe) 902-928 MHz (North America) | ISM band | 1-12 m |
| Bluetooth: 2400 to 2483.5 MHz | ISM band | 0.5-100 m |
| WiFi/microwave: 2400-6000 MHz | ISM band | 1-2 m |
| microwave: 3.1-10 GHz | Ultra wide band | up to 200 m |

In various embodiments, the high frequency (HF) band may be between 3 MHz to 30 MHz. In other embodiments, HF may be at or about 13.56 MHz. In some embodiments, the ultra high frequency (UHF) band may be between 300 MHz and 3,000 MHz. In some embodiments, as shown in the table above, UHF may be between approximately 865 MHz to 915 MHz or between approximately 865 and 868 MHz, such as in Europe. In some embodiments, UHF may be between 902 MHz and 928 MHz, such as in North America. In various embodiments, characteristics described above with respect to frequency, range, and cost may vary by 10%, 20%, 30%, 40% or more from the numbers provided above.

The communication signal 42, the translated wireless device signal 50, the wireless device signal, and/or the translated wireless device signal 50 may be transmitted or received by the communication unit 18 and/or translator 16 using one or more of the following communication protocols: Bluetooth, RFID, WiFi, ZigBee, BLE, Z-Wave, 6LoW-PAN, Thread, WiFI-ah, 2G, 3G, 4G, (LTE Cat 0, 1, or 3), NB-IoT, 5G, NFC, SigFox, LoRaWAN, Ingenu, Weightless-N, Weightless-P, Weightless-W, ANT, ANT+, DigiMesh, MiWi, EnOcean, Dash7, WirelessHART, ISO/IEC 18000-2, ISO/IEC 18000-3, ISO/IEC 18000-4, ISO/IEC 18000-5, ISO/IEC 18000-6, ISO/IEC 18000-7, ISO 14443, ISO 15693, ISO 11784/11785, ISO 14223, SO/IEC 18092, ISO 18185, ISO/IEC 21481, ASTM D7434, ASTM D7435, ASTM D7580, ISO 28560-2, EPC Class 1 Generation 2 (EPC Gen2).

In some embodiments, protocols may organize communication between one or more of an access device 10, 14, translator 16, and/or target wireless device 46. Protocols may define what signal is defined as a binary one or a binary zero, the speed of signals, and organization of packets if any. Protocols may also govern how conflicts between communicating devices are handled.

In various embodiments, the communication unit 18 may be configured to transmit communication signal 42, which may then be received by target wireless device 46 (e.g., an RFID label, Bluetooth transponder, or other wireless device) and/or translator 16. Communication signal 42 may be incompatible with target wireless device 46's hardware or other parameters. For example, communication signal 42 may be incompatible with the frequency of operation for target wireless device 46, or communication signal 42 may be transmitted using a communication protocol that is incompatible with a communication protocol for target wireless device 46. Communication signal 42 may be compatible with one or more of translator 16's hardware, software, or other parameters. In some embodiments, the communication signal 42 may be used to power the target wireless device 46 even if the target wireless device is incompatible with the communication signal 42.

Translator

In order to communicate with the target wireless device 46, access device 10 (e.g., access device 14) may use a translator 16. In some embodiments, such as shown in FIG. 1, the translator 16 may be incorporated as part of the access device 10. In other embodiments, such as in FIG. 2, the translator 16 may be a separate device from the access device 14. By using the translator 16, the access device 10, 14 may be enabled to communicate with the target wireless device 46. In this way, translator 16 may enable the communication unit 18 to perform various purposes that may include one or more of reading from, writing to, programming, receiving programming from, or tracking the target wireless device 46. In various embodiments, the translator 16 may be the same as the translator 52 of FIG. 5.

In embodiments where the translator 16 is incorporated into the access device 10, the access device 10 may have an available port, and the translator 16 may include a mating plug that is received by the port. Corresponding ports and plugs may be used to associate the translator 16 to the access device 10 and/or to provide power to the translator 16 from the access device 10. In various embodiments, the access device 10 may include a housing 34 that at least partially covers or encloses one or more of the communication unit 18, the print head 20, and/or the translator 16. In some embodiments, the translator 16 is composed of semiconductor components that are disposed on the same substrate as the communication unit 18. For example, the substrate may be a circuit board or mother board that includes multiple components of the access device 10.

Figure 4:
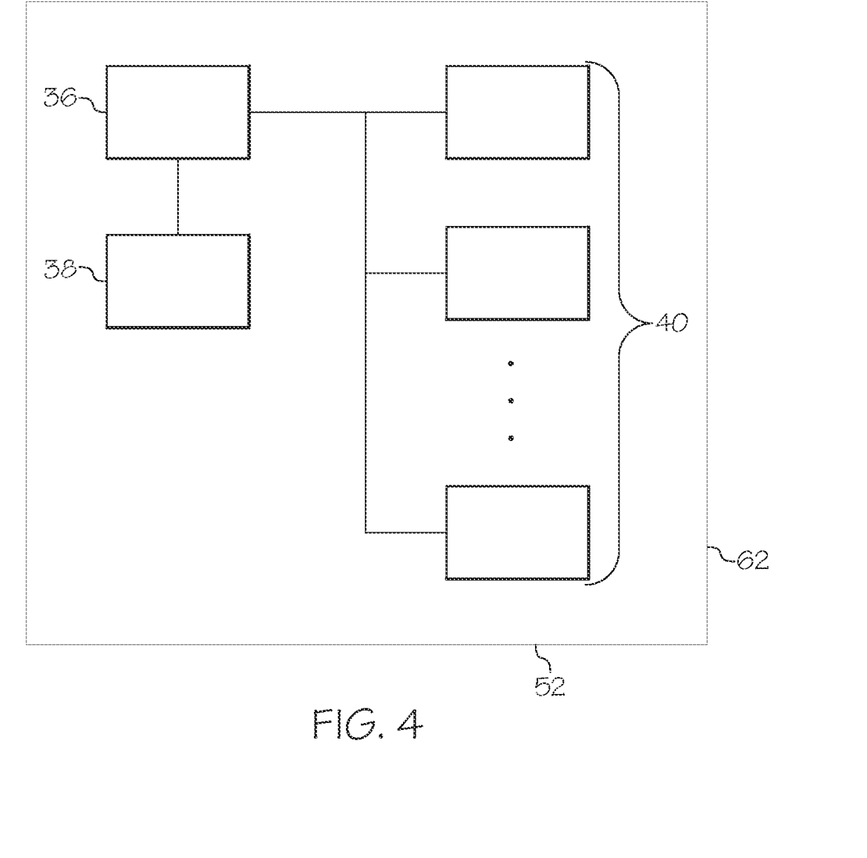
FIG. 4 is a block diagram of an exemplary translator according to some embodiments of the present disclosure.

In various embodiments, where the translator 16 is or comprises a separate device from the access device 10, the translator 16 may include its own housing 62. For example, various embodiments may include the translator 52 shown in FIG. 4, which may be the same as the translator 16 or the computing device 400. Translator 52 may include one or more of a processor 36, a memory 38, a power supply 32, and/or an antenna 40. The translator 52 may include 1, 2, 3, or more antennas 40 which may each be configured to operate at different frequency range and/or with different communication protocols. In other embodiments, multiple antennas 40 may operate in overlapping frequency ranges for various purposes, such as for tracking or enhanced communication.

In various embodiments, translator 16 (e.g., translator 52) may be configured to receive the communication signal 42 from the communication unit 18, such as using at least one of its antennas 40. The translator 16 may be configured to then take the data carried by the communication signal 42 and generate one or more translated signals 44, which each includes data that is based at least in part on the data of the communication signal 42. For example, in some embodiments, if the data carried by the communication signal 42 comprises a unique identifier to be encoded to an RFID label, the one or more translated signals 44 may also be configured to carry the same unique identifier. The number of translated signals 44 may be 1, 2, 3, 4, or more, depending on the hardware configuration of the translator 16, and each of the translated signals 44 may differ from the other translated signals 44 by one or both of its frequency of transmission or its communication protocol.

In various embodiments, translation may be performed by identifying the type of message (e.g., a command, query, or other communication), finding the corresponding or identical message for a target frequency and/or communication protocol, and sending the corresponding message using the target frequency and/or communication protocol. In some embodiments, translation may include reformatting a message to be sent using the target frequency and/or communication protocol. In some embodiments, this may include truncating empty bits from a message, spanning a message across multiple packets, recoding a message from one binary representation to a different binary representation, or other methods. Translation may be performed using a look up table or equivalent look up methods (e.g., database access, corresponding memory locations, a list of commands).

In some embodiments, the translated signal 44 has a frequency that is different from the frequency of the communication signal 42, with the translated signal 44 being in a different frequency band than the communication signal 42. In some exemplary embodiments, the communication signal 42 has a frequency within the UHF band, while the translated signal 44 has a frequency within a different band. Exemplary other bands may include one or more of LF, HF, microwave, Bluetooth, WiFi, microwave, or other parts of the UHF band. In various exemplary embodiments, the communication signal 42 has a frequency within one or more of the LF, HF, UHF, microwave, Bluetooth, WiFi, and microwave bands, while the translated signal 44 has a non-overlapping frequency within one or more of the LF, HF, UHF, microwave, Bluetooth, WiFi, microwave bands.

In some embodiments, the communication signal 42 has a frequency within one or more of the LF, HF, UHF, microwave, Bluetooth, WiFi, and microwave bands, while the translated signal 44 has operates in an overlapping frequency range with the communication signal 42 but with a different protocol than the communication signal 42. Regardless of the particular frequency, frequency band, or protocol, the translated signal 44 may be intended to perform one or more of programming, encoding, or reading, an RFID label (e.g., a target wireless device 46) configured to receive and/or interpret the translated signal.

In various embodiments, the access device 10 of FIG. 1 and the system 12 of FIG. 2 may be used to encode a wireless device 46 operating in a different frequency band than communication unit 18 of the access device 10, 14. This may include encoding an RFID label operating in a single frequency band that is different from the frequency band in which the communication unit 18 of the access device 10, 14 operates or a dual-frequency RFID label having one RF interface in a different frequency band than the frequency band in which the communication unit 18 operates.

In some embodiments, a wireless device 46 may be within range of the communication unit 18 and the translator 16, and may be in position to receive both the communication signal 42 (which is also received by the translator 16) and the translated signal 44. If the wireless device 46 is a multiple-frequency device (e.g., a dual, triple, quadruple, or higher multiple frequency RFID label or tag) having at least one chip and multiple antennas operating in different frequency bands, then the wireless device 46 may receive and be encoded by either or both of the communication signal 42 and the translated signal 44 without requiring the use of a second access device 10 that operates in a different frequency band than the first access device 10. For example, the access device 10 and translator 16 may simultaneously encode the wireless device 46 with both signals. For example, the access device 10 may transmit the communication signal 42, which is received by the wireless device 46 at a first frequency using a first protocol, and the translator 16 may transmit a translated signal 44 that is received by the wireless device 46 at a second frequency using a second protocol while the first communication signal 42 is still being received, interpreted, and/or acted upon by the wireless device 46.

In some embodiments, the access device 10 and the translator 16 may sequentially encode the multiple frequency wireless device 46 with the two or more signals (e.g., first encoding the wireless device 46 using the communication signal 42 and then using the one or more translated signals 44). On the other hand, if the wireless device 46 is not a multiple-frequency device, it may only receive and be encoded by only one of the signals 42, 44.

Figure 3:
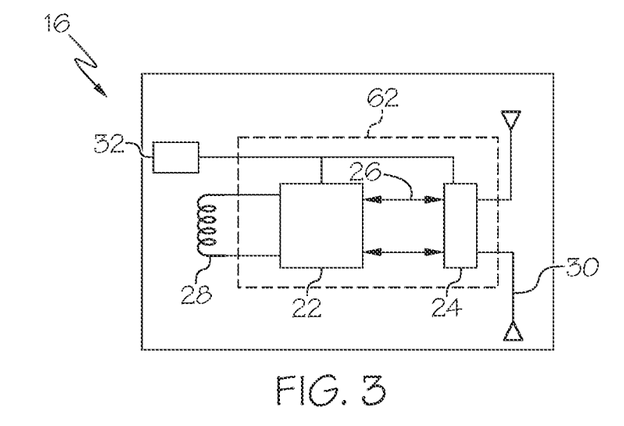
FIG. 3 is a block diagram of an exemplary translator according to some embodiments of the present disclosure.

The particular configuration of the translator 16 may vary without departing from the scope of the present disclosure. For example, as shown in FIG. 3, a translator 16 may include a controlling unit 64 that comprises at least one of an RFID chip 22 and a microcontroller 24 (e.g., a processor 304). In various embodiments, the microcontroller 24 electrically is coupled to the RFID chip 22 (e.g., via a serial data interface 26). The translator 16 may further include a first antenna 28, a second antenna 30, and a power supply 32. One of the antennas 28 may be electrically coupled to the RFID chip 22, while the other antenna 30 is electrically coupled to the microcontroller 24. In various embodiments, both the antennas 28, 30, may be coupled to either the RFID chip 22 or the microcontroller 24. In some embodiments, instead of antenna 28 or antenna, antennas 40 may be substituted, meaning that multiple antennas 40 may be attached at the locations indicated for antenna 28 or antenna 30 to serve the indicated purpose while providing the same or additional capabilities.

One of antennas 28 (e.g., a first antenna) and antenna 30 (e.g., a second antenna) may be configured to communicate with the access device 10. The remaining one of either antenna 28 or antenna 30 may be configured to transmit the translated signal 44 after the data from the communication signal 42 has been extracted. For example, the antenna 28 may be configured to receive the communication signal 42 from the communication unit 18 and transmit the translated wireless signal 50 to the communication unit 18. The antenna 30 may be used to transmit the wireless transmitted signal 44 to the wireless device 46 and receive the wireless device signal 48 from the wireless device 46. In the illustrated embodiment, the first antenna 28 is shown as an HF antenna, while the second antenna 30 is shown as a UHF antenna, but the antennas 28 and 30 may be differently configured without departing from the scope of the present disclosure.

The RFID chip 22 and the microcontroller 24 may be variously configured without departing from the scope of the present disclosure. In various embodiments, the RFID chip 22 and the microcontroller 24 are capable of (in combination) extracting the data from the communication signal 42 and placing it into condition to be transmitted by the translated signal 44. In some embodiments, the RFID chip 22 is a programming chip provided as a UHF Gent chip (such as the Monza X-2K chip manufactured by Impinj, Inc. of Seattle, Washington), equipped with a suitable digital interface, such as I²C. In such an exemplary embodiment, the microcontroller 24 is configured as a combined near field communication reader/writer and microcontroller, such as the PN7462 microcontroller manufactured by NXP Semiconductors N.V. of Eindhoven, Netherlands.

In some embodiments, the translator 16 (e.g., the translator 52 of FIG. 5) may employ a separate power supply 32, such as a battery and/or an AC adaptor for drawing power from an AC power source. In some embodiments, translator 16 may draw power from the access device 10 via a plug or being hardwired into the access device 10 in the embodiment of FIG. 1. In some embodiments, a translator 16 incorporated into an access device 10 (as in FIG. 1) may have its own battery as a power supply 32. In some embodiments, the translator 16 of FIG. 2 that is separate from an access device 10 (e.g., an RFID printer 14) such as in FIG. 2 may employ an external power supply 32, rather than a built-in battery.

Regardless of the nature of the power supply 32, it may be configured to either place the translator 16 into an operative state when the access device 10, 14 is also an operative state or to selectively place the translator 16 into an operative state and a standby or low-energy state when the access device 10, 14 is not in an operative state. In some embodiments in which the translator 16 is configured to be manually or automatically switched between an operative state and a standby state, the translator 16 is in the standby state by default, with the translator 16 being placed into an operative state upon the translator 16 receiving a communication signal 42 from the access device 10, 14. The translator 16 may then be placed back into the standby state after it has transmitted the translated signal 44.

Some dual-band RFID tags may be capable of communicating in multiple frequency bands, such as HF and UHF. Some examples of dual-band devices may be found in U.S. Pat. No. 9,871,294, which is hereby incorporated herein by reference in its entirety. Dual-band RFID tags may be configured to communicate with printers in either or both of its dual modes.

Exemplary Operations

Figure 6:
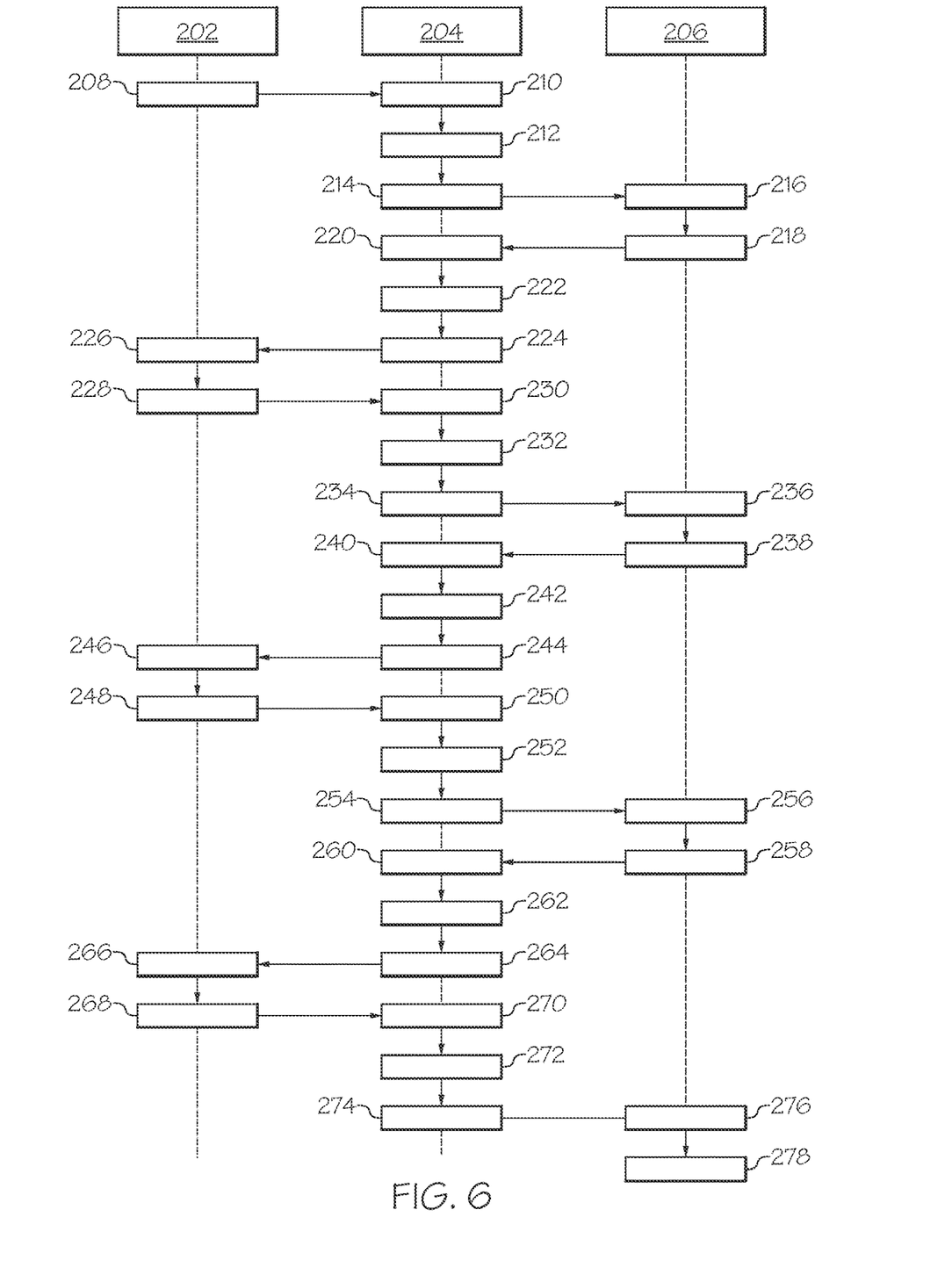
FIG. 6 is a flowchart for wireless communication according to some embodiments of the present disclosure.

FIG. 6 includes exemplary operations of some systems including an access device 202, a translator 204, and a wireless device 206. In various embodiments, the access device 202 may be the same as the access device 10, the access device 14, or the computer system 400. In various embodiments, the translator 204 may be the same as the translator 16, the translator 52, or the computer system 400. In various embodiments, the wireless device 206 may be the same as the wireless device 46 or the computer system 400.

The access device 202 may be unable to communicate with the wireless device 206 because of an incompatibility issue involving one or both of a frequency conflict and a communication protocol conflict. In various embodiments, the translator 204 may facilitate communications by translating various wireless signals coming from the access device 202 into a format compatible with the wireless device. The translator 204 may also translate signals coming from the wireless device 206 into a format compatible with the access device 202.

In some embodiments, the wireless device 206 (e.g., an active or passive RFID tag) may become powered and activated by receiving radio frequency signals, such as from the access device 202, the translator 206, and/or other ambient sources. In such cases, the wireless device 206 may initiate communication with the translator 204 and/or the access device 202.

In operation 208, the access device 202 may transmit or issue a query using communication signal 42 and at least a first frequency and at least a first communication protocol to be received by the translator 204 and/or the wireless device 46. In some embodiments, the access device 202 may use additional frequencies and/or communication protocols to transmit the query.

In operation 210, the translator 204 may receive the query from the wireless device signal 48 using at least the first frequency and/or the first communication protocol. In operation 212, the translator 204 may translate the query into at least a second frequency and/or a second communication protocol. In operation 214, the translator 204 may transmit the translated query using translated signal 44 and the second frequency and the second protocol. In various embodiments, the first frequency and the second frequency may be the same, different, overlapping, or non-overlapping. In various embodiments, the first protocol and the second protocol may be the same or different. In some embodiments, the translator 204 may use additional frequencies and/or communication protocols to transmit the translated query.

In operation 216, the wireless device 206 may receive and process the query sent at the second frequency and/or using the second communication protocol. In operation 218, the wireless device 206 may respond to the query using wireless device signal 48 and at least the second frequency and/or the second communication protocol. The response may include a first identifier (e.g., a random 16 digit number).

In operation 220, the translator 204 may receive the response via the wireless device signal 48 using at least the second frequency and/or the second communication protocol. In operation 222, the translator 204 may translate the response into at least the first frequency and/or the first communication protocol. In operation 224, the translator may transmit the response using the first frequency and/or the first communication protocol. In some embodiments, the translator 204 may use additional frequencies and/or communication protocols to transmit the response to permit the information to be shared in a manner compatible with additional devices. This may improve reception by the original access device 202 or permit communication with other access devices 202.

In operation 226, the access device 202 may receive the response including the first identifier using at least the first frequency and/or the first communication protocol. In operation 228, the access device 202 may issue an acknowledgement that echoes the first identifier using at least the first frequency and/or the first communication protocol.

In operation 230, the translator 204 may receive the acknowledgement that echoes the first identifier from the wireless device signal 48 using at least the second frequency and/or the second communication protocol. In operation 232, the translator 204 may translate the acknowledgement that echoes the first identifier into at least the second frequency and/or the second communication protocol. In operation 234, the translator 204 may transmit the translated acknowledgement using translated signal 44 and the second frequency and the second protocol to be received by the wireless device 206 in operation 236. In some embodiments, the translator 204 may use additional frequencies and/or communication protocols to transmit the acknowledgement.

After receiving the same first identifier that the wireless device 206 initially provided, in operation 238, the wireless device 206 may respond to the acknowledgement using wireless device signal 48 and at least the second frequency and/or the second communication protocol. The response may include an identifier of the wireless device 206. For example, the identifier may include an Electronic Product Code (EPC) number, such as for an RFID tag. The response may further include error check and/or some protocol control bits (PC). The PC bits may provide one or more of the following: the length of the EPC stored in the wireless device 206, and/or the type of object to which the tag is attached (the application family identifier (AFI)).

In operation 240, the translator 204 may receive the response including the EPC, the control bits, the PC, and/or the AFI from the wireless device signal 48 using at least the second frequency and/or the second communication protocol. In operation 242, the translator 204 may translate the response including the EPC, the control bits, the PC, and/or the AFI into at least the first frequency and/or the first communication protocol. In operation 244, the translator may transmit the translated response including the EPC, the control bits, the PC, and/or the AFI (e.g., the using the first frequency and/or the first communication protocol) via the translated wireless device signal 50. In some embodiments, the translator 204 may use additional frequencies and/or communication protocols to transmit the translated response.

In operation 246, the access device 202 may receive the translated response including the EPC, the control bits, the PC, and/or the AFI using at least the first frequency and/or the first communication protocol. In operation 248, the access device 202 may issue a command to the wireless device 206 to generate or provide a stored second identifier using the communication signal 42 and at least the first frequency and/or the first communication protocol. The commands may include reading from or writing to the wireless device 206.

In operation 250, the translator 204 may receive the command to the wireless device 206 to generate or provide a stored second identifier. The command may be interpreted and/or received using at least the first frequency and/or the first communication protocol. In operation 252, the translator 204 may translate the command into at least a second frequency and/or a second communication protocol. In operation 254, the translator 204 may transmit the command using translated signal 44 and at least the second frequency and at least the second protocol to be received by the wireless device 206 in operation 256. In some embodiments, the translator 204 may use additional frequencies and/or communication protocols to transmit the command.

In operation 256, the wireless device 206 may receive and process the command sent at the second frequency and/or using the second communication protocol. After receiving the command, in operation 258 the wireless device 206 may respond by generating or providing a stored version of the second identifier and transmitting the second identifier using wireless device signal 48 and at least the second frequency and/or the second communication protocol.

In operation 260, the translator 204 may receive the second identifier from the wireless device signal 48 using at least the second frequency and/or the second communication protocol. In operation 262, the translator 204 may translate the second identifier into at least the first frequency and/or the first communication protocol. In operation 264, the translator may transmit the translated second identifier (e.g., the using the first frequency and/or the first communication protocol) via the translated wireless device signal 50. In some embodiments, the translator 204 may use additional frequencies and/or communication protocols to transmit the second identifier.

In operation 266, the access device 202 may receive the response including the second identifier using at least the first frequency and/or the first communication protocol. In operation 268, the access device 202 may issue a command such as read, write, lock, or kill using at least the first frequency and/or the first communication protocol.

A read or write command from the access device 10 may correspondingly read or write any of the following information from or to an RFID tag or other wireless device 46: 1) EPC data in its entirety or a subportion or specified portion, such as a quantity of bits based on the EPC size specified in the RFID tag's protocol bits, which may be up to 160 bits; 2) TID (Tag ID) in its entirety, or a subportion such as the first 32 bits or less of the TID; 3) the RFID tag's or other wireless device's 46 access and/or kill passwords; 4) protocol bits from the EPC memory banks.

Reading protocol bits from the EPC memory banks may be followed by identifying the EPC size based on the read protocol bits. A read command may read the size of the EPC, TID, and/or user memory bank size.

A lock command is a command that RFID readers or other access devices 10 can send to an RFID tag or other wireless devices 46 to block access to certain information on the RFID tag or other wireless device 46. A lock command can prevent further modification of data in the RFID tag's or other wireless device's 46 memory or can prevent access to data in the RFID tag's or other wireless device's 46 memory. In some cases, the lock command is permanent and in other cases, a reader or other access device 10 can "unlock" the memory.

A kill command may be a command that RFID readers or other access devices 10 can send to RFID tags or other wireless devices 46 that uses electronic disabling mechanisms to prevent RFID tags or other wireless devices 46 from responding to any additional commands. The primary objective of the kill command may be to protect personal privacy. RFID tags or other wireless devices 46 could potentially be used to track individuals that carry tagged items or wear tagged articles of clothing when the RFID tags or other wireless devices 46 are no longer required for their intended use, such as to expedite checkout or inventory. The ability to disable an RFID tag or other wireless devices 46 with the kill command provides a mechanism to prevent unauthorized access to and illegitimate use of product information stored in the RFID tag or other wireless devices 46.

In operation 270, the translator 204 may receive the command, which may be a read, write, lock, kill, or other command, from the wireless device signal 48 using at least the first frequency and/or the first communication protocol. In operation 272, the translator 204 may translate the command into at least a second frequency and/or a second communication protocol. In operation 274, the translator 204 may transmit the translated query using translated signal 44 and the second frequency and the second protocol to be received by the wireless device 206 in operation 276. In some embodiments, the translator 204 may use additional frequencies and/or communication protocols to transmit the translated command.

In operation 276, the wireless device 206 may receive and process the command sent at the second frequency and/or using the second communication protocol. In operation 278, the wireless device 206 may perform the command in accordance with its programming. In some embodiments, the correct password must be provided with the command, such as for some lock and/or kill commands.

Figure 7:
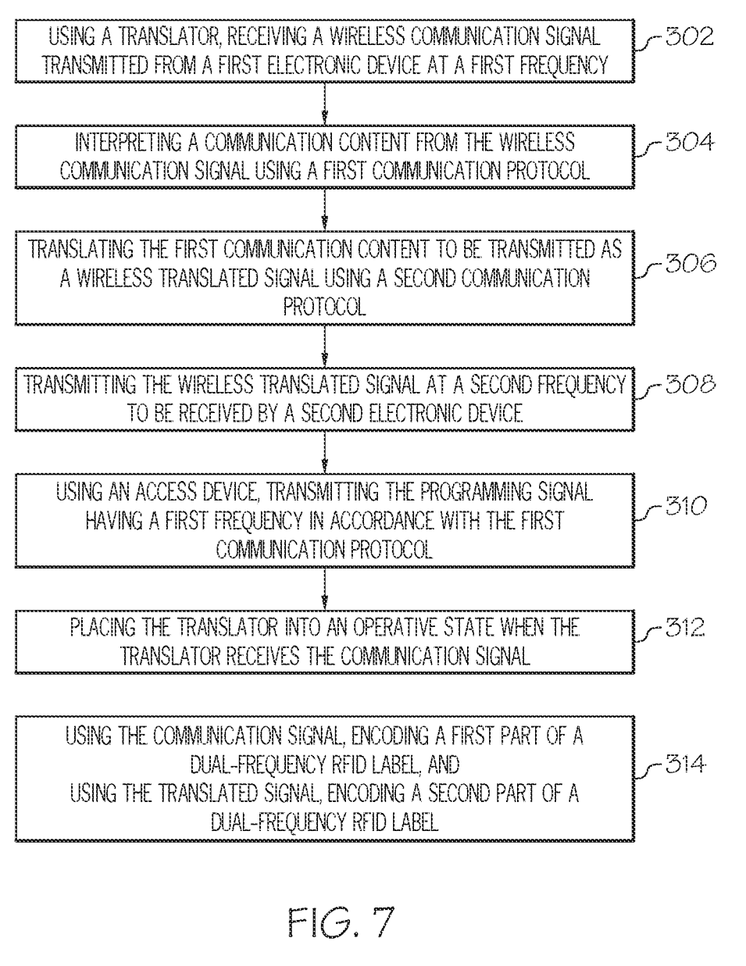
FIG. 7 is a flowchart for wireless communication according to some embodiments of the present disclosure.

FIG. 7 includes a flowchart providing exemplary operations in accordance with some embodiments. Operation 302 includes, using a translator (e.g., translator 16, 54, 204), receiving a wireless communication signal (e.g., communication signal 42, wireless device signal 48) transmitted from a first electronic device (e.g., access device 10, 14, wireless device 46) at a first frequency (e.g., HF, LF, UHF, microwave, Bluetooth).

Operation 304 includes interpreting a communication content from the wireless communication signal using a first communication protocol.

Operation 306 includes translating the first communication content to be transmitted as a wireless translated signal using a second communication protocol.

Operation 308 includes transmitting the wireless translated signal at a second frequency to be received by a second electronic device (e.g., a different access device 10, 14, or wireless device 46). Some embodiments may stop at operation 308, while others continue with operations 310 and/or other operations.

Some embodiments may perform operation 310, which includes using an access device 10, transmitting the programming signal having a first frequency in accordance with the first communication protocol. Some embodiments may perform operation 312, which includes placing the translator (e.g., translator 16, 54, 204) into an operative state when the translator receives the communication signal. Some embodiments may perform operation 314, which includes using the communication signal, encoding a first part of a dual-frequency RFID label, and using the translated signal, encoding a second part of a dual-frequency RFID label.

Exemplary Systems

A block diagram depicting an example of a system (i.e., computer system 400) that may be used to process signals and/or perform operations described in this disclosure is provided in FIG. 5. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

In various embodiments, the computer system 400 may include or form at least a part of a laptop, tablet, smartphone, RFID reader, RFID printer, desktop printer, desktop computer, manufacturing systems, smart watches, activity trackers, RFID tags, Bluetooth readers, Bluetooth beacons, access device 202, wireless device 206, translator 204, or other electronic devices, some of which may include at least a processor.

The computer system 400 may include an address/data bus 402 that is configured to communicate information. Additionally, one or more data processing units, such as a processor 304 (or processors), are coupled with the address/data bus 402. The processor 304 is configured to process information and instructions. In an aspect, the processor 304 is a microprocessor. Alternatively, the processor 304 may be a different type of processor such as a parallel processor, application-specific integrated circuit (ASIC), programmable logic array (PLA), complex programmable logic device (CPLD), or a field programmable gate array (FPGA).

The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In an aspect, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 100. In accordance with one aspect, the input device 412 is an alphanumeric input device, such as a keyboard, that may include alphanumeric and/or function keys. Alternatively, the input device 412 may be an input device other than an alphanumeric input device. In an aspect, the computer system 400 may include a cursor control device 414 coupled with the address/data bus 402, wherein the cursor control device 414 is configured to communicate user input information and/or command selections to the processor 100. In an aspect, the cursor control device 414 is implemented using a device such as a mouse, a track-ball, a track-pad, an optical tracking device, or a touch screen. The foregoing notwithstanding, in an aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In an aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In an aspect, the display device 418 may include a cathode ray tube ("CRT"), liquid crystal display ("LCD"), field emission display ("FED"), Light Emitting Diode ("LED")", plasma display, or any other display device suitable for displaying video and/or graphic images and alphanumeric characters recognizable to a user.

The computer system 400 presented herein is an example computing environment in accordance with an aspect. However, the non-limiting example of the computer system 200 is not strictly limited to being a computer system. For example, an aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 8:
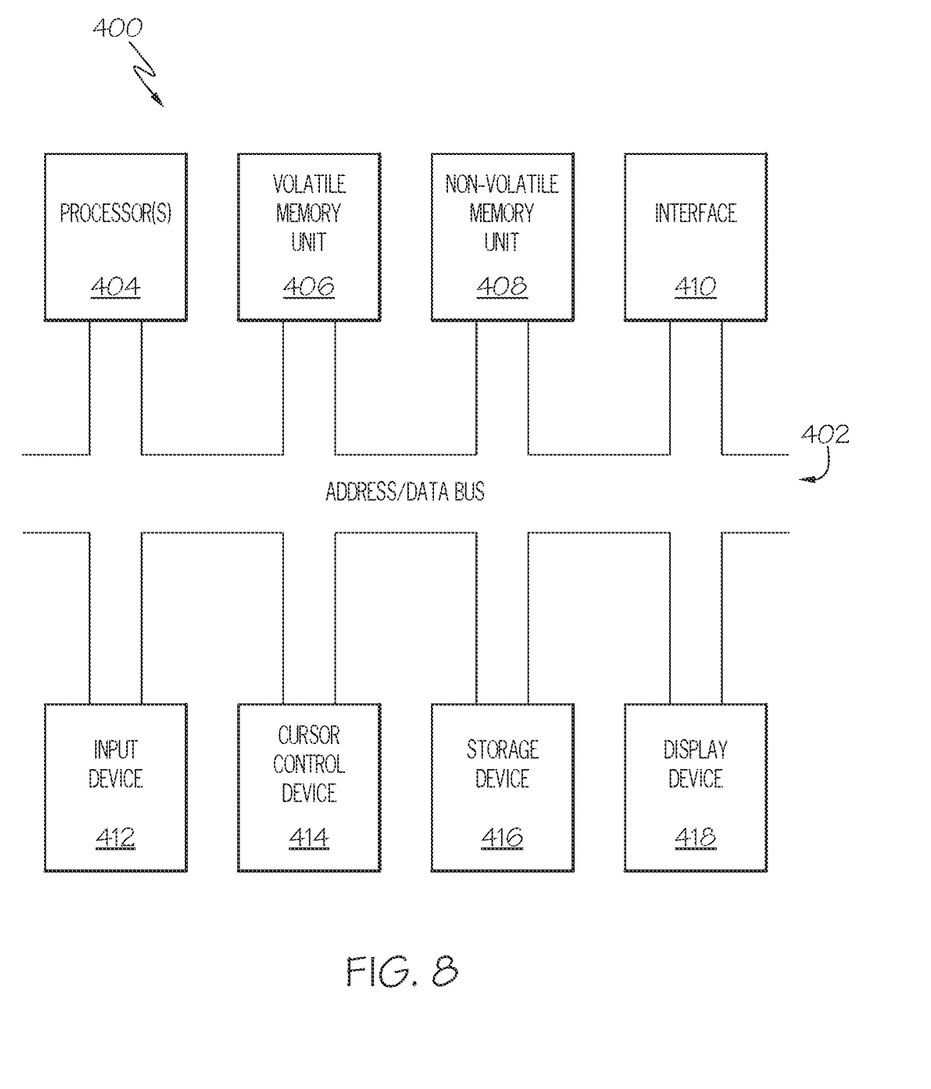
FIG. 8 is a block diagram of an exemplary computer system, according to various embodiments.
Figure 9:
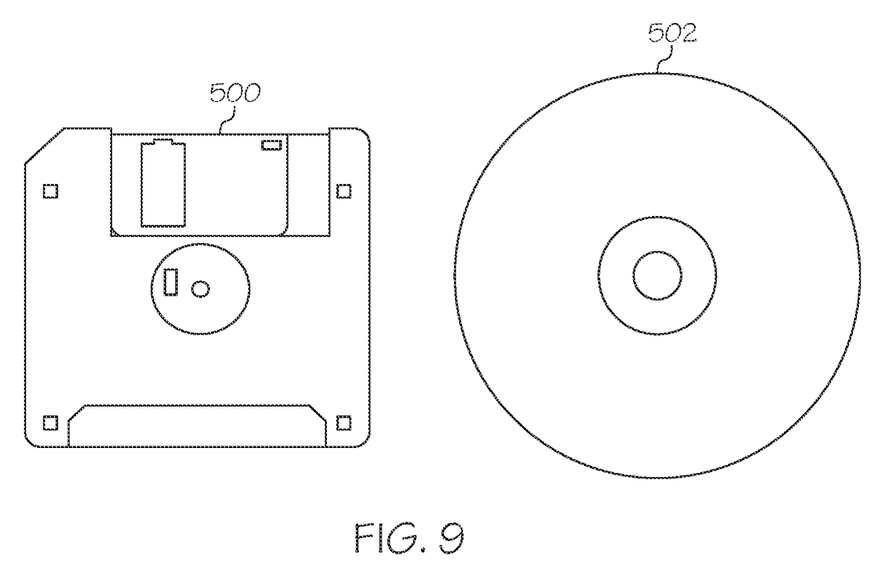
FIG. 9 are illustrative diagrams of computer program products, according to various embodiments.

An illustrative diagram of a computer program product (i.e., storage device) is depicted in FIG. 8. The computer program product is depicted as floppy disk 500 or an optical disk 502 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

The terms "one or more of a, b, and c", "at least one of a, b, and c", and "at least one of a, b, or c" are intended to refer to a, b, c, or combinations thereof including 1) one or multiple of a and one or multiple of b, 2) one or multiple of b and one or multiple of c, 3) one or multiple of a and one or multiple of c, 4) one or multiple of a, 5) one or multiple of b, or 6) one or multiple of c.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A wireless electronic device translation system, comprising:
   a translator comprising
   a first antenna,
   a second antenna, and
   a controlling unit coupled to the first antenna and the second antenna,
   the translator being configured to
   receive a wireless communication signal transmitted from an access device at a first frequency,
   interpret a communication content from the wireless communication signal using a first communication protocol,
   translate the first communication content to be transmitted as a wireless translated signal using a second communication protocol, and
   transmit the wireless translated signal at a second frequency to be received by a second electronic device,
   wherein the access device is an RFID printer comprising a print head, and the print head is configured to render an RFID label unreadable when there has been an error in encoding the RFID label.

2. The system of claim 1, wherein the first frequency is different from the second frequency.

3. The system of claim 1, further comprising the access device configured to use the first communication protocol to transmit the wireless communication signal having a first frequency.

4. The system of claim 1, wherein the frequency of the wireless communication signal is within an ultra high frequency band, and the frequency of the wireless translated signal is within a high frequency band.

5. The system of claim 1, wherein the controlling unit comprises at least one of an RFID chip and a microcontroller,
   wherein the first antenna is configured to receive signals in the same frequency band as the wireless communication signal, and
   wherein the second antenna is configured to transmit the wireless translated signal.

6. The system of claim 1, further comprising a power supply configured to place the translator into an operative state when an access device is in an operative state.

7. The system of claim 1, further comprising a power supply configured to place the translator into an operative state when the translator receives the wireless communication signal.

8. The system of claim 1, further comprising a power supply comprising a battery.

9. The system of claim 1, wherein the access device is configured to transmit a wireless communication signal carrying data to be encoded in a first part of a dual-frequency RFID label and transmit a wireless translated signal carrying data to be encoded in a second part of a dual-frequency RFID label.

10. A method, comprising:
    using a translator, receiving a wireless communication signal transmitted from an access device at a first frequency;
    interpreting a communication content from the wireless communication signal using a first communication protocol;
    translating the first communication content to be transmitted as a wireless translated signal using a second communication protocol; and
    transmitting the wireless translated signal at a second frequency to be received by a second electronic device,
    wherein the access device is an RFID printer comprising a print head, and the method further comprises:
    using the print head, rendering an RFID label unreadable when there has been an error in encoding the RFID label.

11. The method of claim 10, wherein the first frequency is different from the second frequency.

12. The method of claim 10, further comprising:
    using the access device, transmitting the wireless communication signal having a first frequency in accordance with the first communication protocol.

13. The method of claim 10, wherein the frequency of the wireless communication signal is within an ultra high frequency band, and the frequency of the wireless translated signal is within a high frequency band.

14. The method of claim 10, wherein the translator comprises:

a controlling unit comprising at least one of an RFID chip and a microcontroller, a first antenna electrically coupled to the controlling unit, the first antenna being configured to receive signals in a frequency band compatible with the communication signal, and a second antenna electrically coupled to the controlling unit and configured to transmit said translated signal.

15. The method of claim 10, further comprising:

placing the translator into an operative state when an access device is in an operative state.

16. The method of claim 10, further comprising:

placing the translator into an operative state when the translator receives the communication signal.

17. The method of claim 10, wherein the translator further comprises a power supply comprising a battery.

18. The method of claim 10, further comprising:

using the communication signal, to carry data for encoding a first part of a dual-frequency RFID label, and using the translated signal, to carry data for encoding a second part of a dual-frequency RFID label.

\* \* \* \* \*